128,680

UNITED STATES PATENT OFFICE.

JOSEPH C. TUCKER, OF NEW YORK, N. Y.

IMPROVEMENT IN COMPOSITIONS FOR FORMING BLOCKS FOR PAVEMENTS, &

Specification forming part of Letters Patent No. 128,680, dated July 2, 1872; antedated June 29, 1872.

*To all whom it may concern:*

Be it known that I, JOSEPH C. TUCKER, M. D., of the city, county, and State of New York, have invented a new and useful Improved Composition for forming Blocks, Pavements, Tiles, Walls, Roofing, Sea-Walls, and for other purposes, of which the following is a specification.

My invention consists in combining, with asphaltum, blast-furnace slag, which, when properly treated and mixed, form a cheap and durable compound for forming artificial stone for blocks, pavements, and other purposes.

The asphaltum is heated in the ordinary manner to render the same anhydrous, and is mixed in its heated state with the previously-prepared slag or its equivalent, or the slag may be made to melt and adhere to the asphaltum by friction caused by revolving the same in a cylinder, and this warm mass, when thoroughly incorporated and in a plastic state, is passed into molds of any desired shape, and subjected to pressure or concussion, or is spread directly upon the ground and pressed by means of rollers or stamps.

In carrying out my invention I take of the above-named ingredients of about the following proportions, namely: Slag, the refuse from smelting or blast-furnaces, eighty (80) parts; asphaltum, twenty (20) parts.

The slag is broken or crushed to a proper size in a suitable machine, when it is placed within a cylinder or other device and subjected to heat, and is mechanically mixed with the asphaltum, when they are ready for any of the various uses to which they may be applied.

Blocks formed in molds or dies are liable to shrinkage upon cooling, or to adhere to the same. To prevent this the molds or dies are washed or coated with dry or slack lime before the compound is pressed.

I propose to form pavement-blocks by molding or pressing into blocks the slag, either alone or with stone and asphalt, while in a heated state. This is an important part of my invention, and one which I believe to be new.

The combination of the slag with asphaltum forms the essential feature of my invention, and may be used in connection with any other ingredients now employed for forming blocks, pavements, roofing, walls, and other purposes, such as broken stone, gravel, &c., without departing from the nature and spirit of my invention.

I not limit myslf to the above-named proportions, as they may be increased or diminished as required for the different purposes for which the compound is intended.

Having thus described my invention, what I claim as new, and desire to secure by Letters Patent, is—

1. Artificial-stone blocks, formed from a composition of blast-furnace slag, combined with asphaltum, substantially as and for the purposes set forth.

2. A compound, composed of asphaltum and blast-furnace slag, as described, the mixture being heated and spread upon the ground, and subjected to pressure, substantially as and for the purpose set forth.

To the above I have signed my name this 22d day of December, A. D. 1871.

J. C. TUCKER.

Witnesses:
JAMES L. NORRIS,
WM. J. PEYTON.